US009571003B2

(12) United States Patent
Neyman

(10) Patent No.: US 9,571,003 B2
(45) Date of Patent: Feb. 14, 2017

(54) NON-ISOLATED AC-TO-DC CONVERTER WITH FAST DEP-FET TURN ON AND TURN OFF

(71) Applicant: IXYS Corporation, Milpitas, CA (US)

(72) Inventor: Leonid A. Neyman, Sunnyvale, CA (US)

(73) Assignee: IXYS Corporation, Milpitas, CA (US)

(*) Notice: Subject to any disclaimer, the term of this patent is extended or adjusted under 35 U.S.C. 154(b) by 160 days.

(21) Appl. No.: 14/700,431

(22) Filed: Apr. 30, 2015

(65) Prior Publication Data

US 2015/0236613 A1 Aug. 20, 2015

Related U.S. Application Data

(63) Continuation-in-part of application No. 14/152,989, filed on Jan. 10, 2014, now Pat. No. 9,054,587, which
(Continued)

(51) Int. Cl.
*H02J 7/00* (2006.01)
*H02M 7/217* (2006.01)

(52) U.S. Cl.
CPC .................... *H02M 7/217* (2013.01)

(58) Field of Classification Search
USPC ........ 320/106, 166; 323/285, 286, 282, 284, 323/351
See application file for complete search history.

(56) References Cited

U.S. PATENT DOCUMENTS 5,469,046 A * 11/1995 Wong .................. H02M 7/2176
323/282
5,483,142 A * 1/1996 Skibinski ............... H02H 9/001
320/166
(Continued)

FOREIGN PATENT DOCUMENTS

DE 3304759 2/1983
DE 4028348 9/1990
(Continued)

OTHER PUBLICATIONS

Extended European Search Report (EESR) dated Nov. 28, 2013, from EPO in related foreign application EP13178847.3 (8 pages).

*Primary Examiner* — Brian Ngo
(74) *Attorney, Agent, or Firm* — Imperium Patent Works; T. Lester Wallace

(57) ABSTRACT

Within a non-isolated and efficient AC-to-DC power supply circuit: 1) a dep-FET is turned off to decouple an output voltage $V_O$ node from a $V_R$ node when a rectifier output signal $V_R$ on the $V_R$ node is greater than a first predetermined voltage $V_P$ and, 2) the dep-FET is enabled to be turned on so that a constant charging current flows from the $V_R$ node and onto the $V_O$ node when $V_R$ is less than $V_P$ (provided that $V_O$ is less than a second predetermined voltage $V_{O(MAX)}$ and provided that $V_R$ is adequately greater than $V_O$). To speed turn off and on of the dep-FET, gate charge of the dep-FET is removed and is stored in a second capacitor when the dep-FET is to be turned off, and charge from the second capacitor is moved back onto the gate of the dep-FET when the dep-FET is to be turned on.

27 Claims, 6 Drawing Sheets

Related U.S. Application Data is a continuation-in-part of application No. 13/569,458, filed on Aug. 8, 2012, now Pat. No. 9,225,260.

(56) References Cited

U.S. PATENT DOCUMENTS

| | | | | |
|---|---|---|---|---|
| 5,646,514 | A * | 7/1997 | Tsunetsugu | H02M 7/2176 323/285 |
| 5,844,792 | A * | 12/1998 | Moreau | H02M 1/4208 320/166 |
| 7,729,147 | B1 | 6/2010 | Wong et al. | 363/147 |
| 2005/0007076 | A1* | 1/2005 | Thiery | G05F 1/613 320/166 |
| 2008/0144341 | A1* | 6/2008 | Cook | H02M 1/32 363/53 |
| 2010/0270982 | A1* | 10/2010 | Hausman, Jr. | H02M 5/293 320/166 |
| 2011/0234176 | A1* | 9/2011 | Nakamura | H02M 1/08 320/166 |
| 2014/0043878 | A1 | 2/2014 | Neyman | 363/89 |
| 2014/0062427 | A1* | 3/2014 | Coleman | G05F 1/614 323/233 |
| 2014/0126258 | A1 | 5/2014 | Neyman | 363/89 |

FOREIGN PATENT DOCUMENTS

| | | |
|---|---|---|
| EP | 0622889 | 4/1993 |
| EP | 0651499 | 11/1993 |
| GB | 2208019 | 8/1987 |

\* cited by examiner

DETAIL OF SW2 OF FIG. 1

NON-ISOLATED AC-TO-DC CONVERTER WITH FAST DEP-FET TURN ON AND TURN OFF

CROSS REFERENCE TO RELATED APPLICATIONS

This application is a continuation-in-part of, and claims the benefit under 35 U.S.C. §120 from, nonprovisional U.S. patent application Ser. No. 14/152,989, entitled "Non-Isolated AC-to-DC Converter Having A Low Charging Current Initial Power Up Mode," filed on Jan. 10, 2014, which in turn is a continuation-in-part of, and claims the benefit under 35 U.S.C. §120 from, nonprovisional U.S. patent application Ser. No. 13/569,458, entitled "High-Efficiency, Low-Power Power Supply Circuit," filed on Aug. 8, 2012. This patent application incorporates by reference U.S. patent application Ser. No. 13/569,458 and Ser. No. 14/152,989.

TECHNICAL FIELD

The described embodiments relate to AC-to-DC power supply circuits suitable for receiving an AC supply voltage and for supplying a small amount of power at a low DC voltage in an efficient manner.

BACKGROUND INFORMATION

Several types of power supply circuits exist that can be used to receive alternating current (AC) power from AC power sources and to supply a small amount of power at direct current (DC) voltage levels to individual integrated circuits. A typical integrated circuit to be powered may, for example, require only about ten milliamperes of supply current at a low supply voltage of 3.3 volts. One particularly advantageous non-isolated AC-to-DC converter power supply circuit usable to receive AC power from an AC source and to output a small amount of power at a DC voltage level is set forth in: 1) U.S. patent application Ser. No. 13/569,458, entitled "High-Efficiency, Low-Power Supply Circuit", filed Aug. 8, 2012, by Leonid A. Neyman, now published as US2014/0043878, and 2) U.S. patent application Ser. No. 14/152,989, entitled "Non-Isolated AC-to-DC Converter Having A Low Charging Current Initial Power Up Mode", filed Jan. 10, 2014, by Leonid A Neyman, now published as US2014/0126258.

SUMMARY

Within a non-isolated and efficient AC-to-DC converter power supply circuit, a rectifier receives an input AC supply voltage signal (for example, 120 VAC RMS 60 Hz, or 240 VAC RMS 50 Hz) and outputs a rectified voltage signal $V_R$ onto a $V_R$ node. As the AC-to-DC converter power supply circuit operates, energy is stored in a first capacitor so that the first capacitor is charged to and maintains a DC voltage. The DC voltage (for example, 3.3 volts) is very much smaller than the peak voltage (for example, 340 volts) of the AC supply voltage signal. The first capacitor is a larger output storage capacitor coupled between an output voltage node $V_O$ and a ground node GND. As the non-isolated AC-to-DC converter power supply circuit operates: 1) an N-channel depletion mode field effect transistor (dep-FET) within the AC-to-DC converter power supply circuit is turned off so as to decouple the output voltage $V_O$ node from the $V_R$ node when the rectifier output signal $V_R$ on the $V_R$ node is greater than a first predetermined voltage $V_P$ and, 2) the dep-FET is enabled to be turned on such that a constant charging current is supplied from the $V_R$ node and onto the $V_O$ node and to the first capacitor when $V_R$ is less than $V_P$ (provided that the output voltage $V_O$ on the $V_O$ node is less than a second predetermined voltage $V_{O(MAX)}$ and provided that $V_R$ is adequately greater than $V_O$). During this operation, to speed turn off and turn on of the dep-FET, charge from the gate of the dep-FET is removed and is stored in a second capacitor when the dep-FET is to be turned off, and charge from the second capacitor is moved back onto the gate of the dep-FET when the dep-FET is to be turned on. In one example involving a full-wave bridge rectifier, due to the accelerated turn off and turn on of the dep-FET, there can be four pulses of the constant charging current that flow into the first capacitor during steady state operation during each sinusoidal period of an input 240 VAC RMS 50 Hz supply voltage.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention. It is to be understood that the waveforms in the drawings are idealized waveforms presented for illustrative purposes. The idealized waveforms are inaccurate in certain minor respects. More accurate waveforms can be determined by using the well known circuit simulator SPICE (using an accurate depletion mode FET model) to simulate the actual power supply circuit of interest and/or by fabricating the actual circuit and then testing it.

FIG. 5 is a waveform diagram that shows how the second switch SW2 and the second capacitor C2 of the power supply circuit of FIG. 1 operate together to remove charge from the gate of the dep-FET 17 when the dep-FET 17 is being turned off, and how they operate together to move change from the second capacitor and back onto the gate of the dep-FET 17 when the dep-FET 17 is to be turned on.

DETAILED DESCRIPTION

Reference will now be made in detail to embodiments of the invention, examples of which are illustrated in the accompanying drawings. The term "lead" is used in this patent document in a broad sense to mean a terminal or connection point or electrode of a circuit component. A lead can, for example, be an amount of metal or an amount of diffusion within an integrated circuit, or can be a bonding pad of an integrated circuit die, or can be a semiconductor device package terminal.

Figure 1:
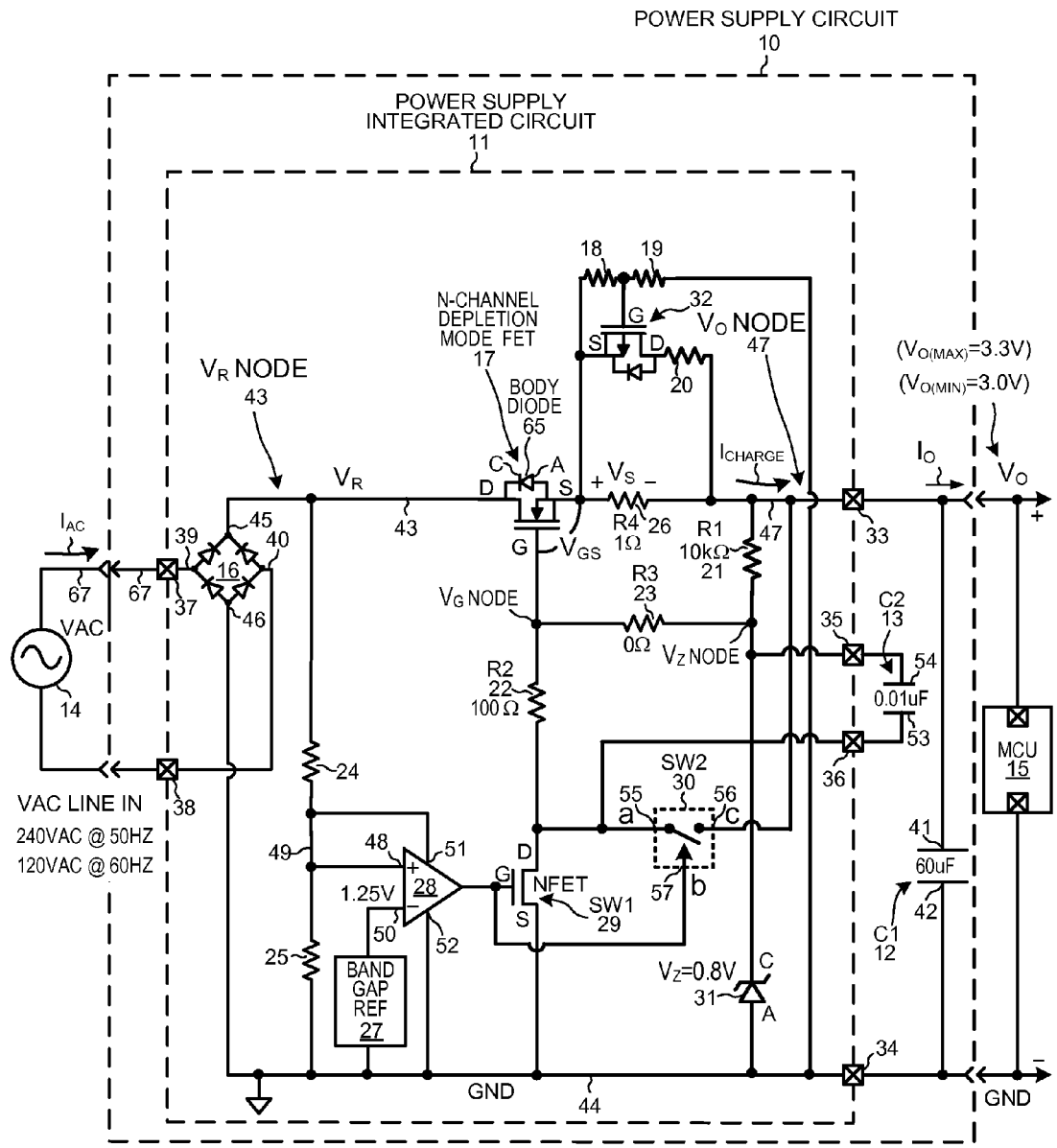
FIG. 1 is a diagram of a high-efficiency, low-power, non-isolated AC-to-DC converter power supply circuit 10 in accordance with one novel aspect.

FIG. 1 is a circuit diagram of a high-efficiency, low-power, AC-to-DC converter power supply circuit 10 in accordance with one novel aspect. Power supply circuit 10 includes a power supply integrated circuit 11, a first capacitor 12, and a second capacitor 13. The three components of the power supply circuit 10 may, for example, be disposed in a single four terminal package. The power supply circuit 10 receives sinusoidal AC wall power from an AC power source 14 and supplies up to twenty milliamperes of 3.3 volt DC supply current $I_O$ to a load, such as for example a microcontroller integrated circuit 15. In one example, AC power source 14 is 240 VAC 50 Hz power such as is typically available from a wall socket in a home in a European country. In another example, the AC power source 14 is 120 VAC 60 Hz power such as is typically available from a wall socket in the United States. In the case of a four terminal packet, two of the terminals are VAC input terminals, and two of the terminals are VDC output terminals.

Power supply integrated circuit 11 includes a full-wave bridge rectifier 16, an N-channel depletion mode field effect transistor (dep-FET) 17, a plurality of resistors 18-26, a bandgap voltage reference circuit 27, a comparator 28, a first switch SW1 29 (which in this case is an N-channel field effect transistor (NFET)), a second switch SW2 30 (which in this case is a switch circuit involving a P-channel field effect transistor (PFET)), a zener diode 31, and another PFET 32. Reference numerals 33-38 identify terminals of the power supply integrated circuit 11.

AC power is received onto integrated circuit 11 from AC power source 14 via terminals 37 and 38. Terminal 37 is coupled to lead or node 39 of the full-wave bridge rectifier 16. Terminal 38 is coupled to lead or node 40 of the full-wave bridge rectifier 25. Charging current is supplied from integrated circuit 11 to first capacitor 12 via terminal 33 to capacitor lead 41, and via terminal 34 to the second lead 42 of capacitor 12. In the present example, power supply circuit 10 is to supply an average of twenty milliamperes of supply output current $I_O$ at 3.3 volts DC, where the supply voltage $V_O$ between terminals 33 and 34 is to vary by not more than ten percent when the power supply circuit is under load. The output voltage $V_O$ therefore has a maximum value $V_{O(MAX)}$ of 3.3 volts and has a minimum value $V_{O(MIN)}$ of 3.0 volts. In the present example, AC power source 14 supplies a sinusoidal 240 VAC RMS voltage signal at 50 Hz. Bridge rectifier 16 receives the 240 VAC RMS sinusoidal 50 Hz voltage signal via terminals 37 and 38 and outputs a full wave rectified signal $V_R$ onto node $V_R$ 43. Node 44 is a ground node GND. Lead 45 of bridge rectifier 16 is coupled to and is a part of $V_R$ node 43. Lead 46 of bridge rectifier 16 is coupled to, and is a part of, GND node 44. The full wave rectified signal $V_R$ has a minimum value $V_{R(MIN)}$ of approximately 3.15 volts and has a maximum value $V_{R(MAX)}$ of about +340 volts.

Circuit components 24, 25, 27 and 28 together are a voltage detector circuit. The voltage detector circuit detects when $V_R$ is above a first predetermined voltage $V_P$, and when $V_R$ is detected to be above $V_P$ then the voltage detector circuit disables charging so that the $V_O$ node 47 is decoupled from the $V_R$ node 43. When charging is disabled in this way, charging current does not flow from the $V_R$ node, through the dep-FET 17, through the $V_O$ node 47, and to the first capacitor 12. The magnitude of the first predetermined voltage $V_P$ is determined by the ratio of the resistances of the resistors 24 and 25. Resistors 24 and 25 form a resistive voltage divider. The first predetermined voltage $V_P$ is 4.8 volts. The non-inverting input lead 48 of comparator 28 is coupled to tap node 49 of the restive voltage divider, whereas the inverting input lead 50 of comparator 28 is coupled to receive a 1.25 volt reference voltage from the bandgap reference voltage generator 27. The supply voltage lead 51 of comparator 28 is coupled to node 49 whereas the ground lead 52 of comparator 28 is coupled to ground node 44.

If the voltage $V_R$ on $V_R$ node 43 is higher than the first predetermined voltage $V_P$, then the voltage on node 49 is greater than 1.25 volts, and comparator 28 drives the voltage on the gate of the first switch NFET 29 high. First switch NFET 29 is turned on. First switch NFET 29 becomes conductive and pulls the voltage on the gate of dep-FET 17 down. When the first switch NFET 29 is on (closed) then the second switch SW2 is off (open), and vice versa when the first switch NFET 29 is off (open) then the second switch SW2 is on (closed). As a result of the first switch NFET 29 being on and conductive, the gate-to-source voltage $V_{GS}$ of dep-FET 17 exceeds the 2.5 volt $V_{GS(OFF)}$ of dep-FET 17, and dep-FET 17 is turned off. No charging current therefore can flow from $V_R$ node 43, through dep-FET 17, to $V_O$ node 47, and into the first capacitor 12. Dep-FET 17 remains off as long as $V_R$ is above the first predetermined voltage $V_P$ of 4.8 volts. During this time the second switch SW2 is off, and the first switch SW1 is on, so the second lead 53 of the second capacitor 13 is coupled to ground. The first lead 54 of the second capacitor 13 is coupled to the $V_Z$ node. The second capacitor 13 is therefore charged over time to the voltage on the $V_Z$ node.

If, however, the voltage $V_R$ on node 43 drops below the first predetermined voltage $V_P$, then the first switch SW1 NFET 29 is turned off, and the second switch SW2 is turned on. Provided that $V_O$ on node 47 is lower than a second predetermined voltage $V_{O(MAX)}$ and provided that $V_R$ on node 43 is adequately higher than $V_O$ on node 47, then a substantially constant charging current ($I_{CHARGE}$) flows from the $V_R$ node 43, through the dep-FET 17, and onto $V_O$ node 47 and to the first capacitor C1 12. In the present example, the first capacitor C1 12 is a larger storage capacitor having a capacitance of sixty microfarads. If the first capacitor 12 is not fully charged and the voltage $V_O$ is less than $V_{O(MAX)}$, then the charging current $I_{CHARGE}$ will flow to the first capacitor C1 12 to increase the voltage on the first capacitor C1 12. If the first capacitor C1 12 is fully charged to the desired $V_{O(MAX)}$ voltage (in the present example, 3.3 volts), then the $V_O$ voltage on node 47 is not lower than the second predetermined voltage $V_{O(MAX)}$ and no charging current flows. The magnitude of the second predetermined voltage $V_{O(MAX)}$ is determined by the zener voltage of zener diode 31. Under steady state operation of the circuit, as the charging current flows, the second switch SW2 is on (closed) and the first switch NFET 29 is off (open), so the second lead 53 of the second capacitor C2 13 is coupled through the second switch SW2 to the $V_O$ node 47. The first lead 54 of the second capacitor C2 13 is coupled to the $V_Z$ node, so the second capacitor C2 13 is discharged.

The charging current $I_{CHARGE}$ is a constant charging current because the second predetermined voltage $V_{O(MAX)}$ is 3.3 volts, and $V_{GS(OFF)}$ of dep-FET 17 is 2.5 volts, and the zener voltage $V_Z$ of zener diode 31 is 0.8 volts. With the first switch SW1 NFET 29 being off, the voltage on the gate of dep-FET 17 is fixed at 0.8 volts due to the zener diode 31. As current flows through the dep-FET 17, the magnitude of the voltage drop $V_S$ across resistor R4 26 increases. ($V_S$ here is the voltage drop across R4 resistor 26, not the absolute voltage on the source of dep-FET). The increase in voltage $V_S$ serves to increase $V_{GS}$ of the dep-FET 17. Increasing $V_{GS}$ causes the internal resistance of the dep-FET to increase, thereby decreasing current flow through dep-FET. Due to the voltage drop $V_S$ across the resistor R4 26, and due to the gate voltage on dep-FET 17 being fixed by zener diode 31, current flow through dep-FET 17 remains substantially constant. This substantially constant charging current $I_{CHARGE}$ charges the first capacitor C1 12. If after a period of charging the voltage $V_O$ reaches 3.3 volts, then the source voltage on dep-FET 17 is large enough with respect to the gate voltage as set by zener diode 31 that dep-FET 17 is turned off. The pulse of charging current then stops. The second predetermined voltage $V_{O(MAX)}$ is equal to the sum of $V_Z$ and $V_{GS(OFF)}$.

Figure 2:
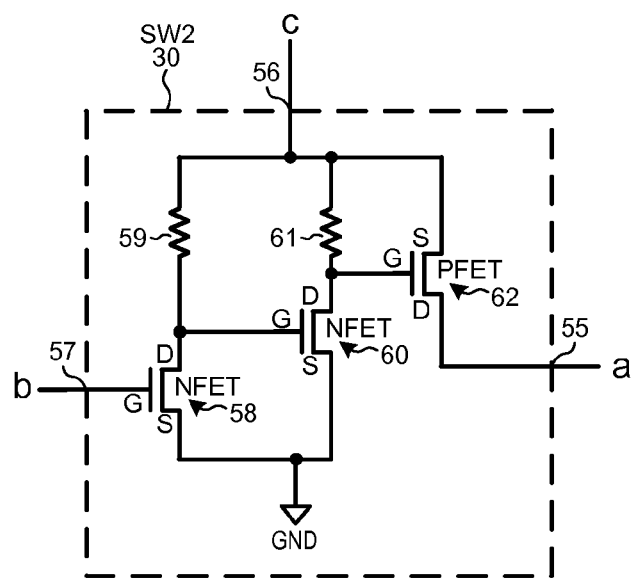
FIG. 2 is a more detailed diagram of one example of the second switch SW2 within the power supply circuit 10 of FIG. 1.

FIG. 2 is a more detailed diagram of one example of the second switch SW2 30. The second switch 30 has a first terminal a 55, a second terminal c 56, and a third control terminal b 57. The second switch 30 includes an initial inverting stage (including N-channel FET 58 and resistor 59), a level-shifting stage (including N-channel FET 60 and resistor 61), and a P-channel FET 62. The initial inverting stage and the level-shifting stage generate a drive signal for the P-channel FET 62.

Figure 3:
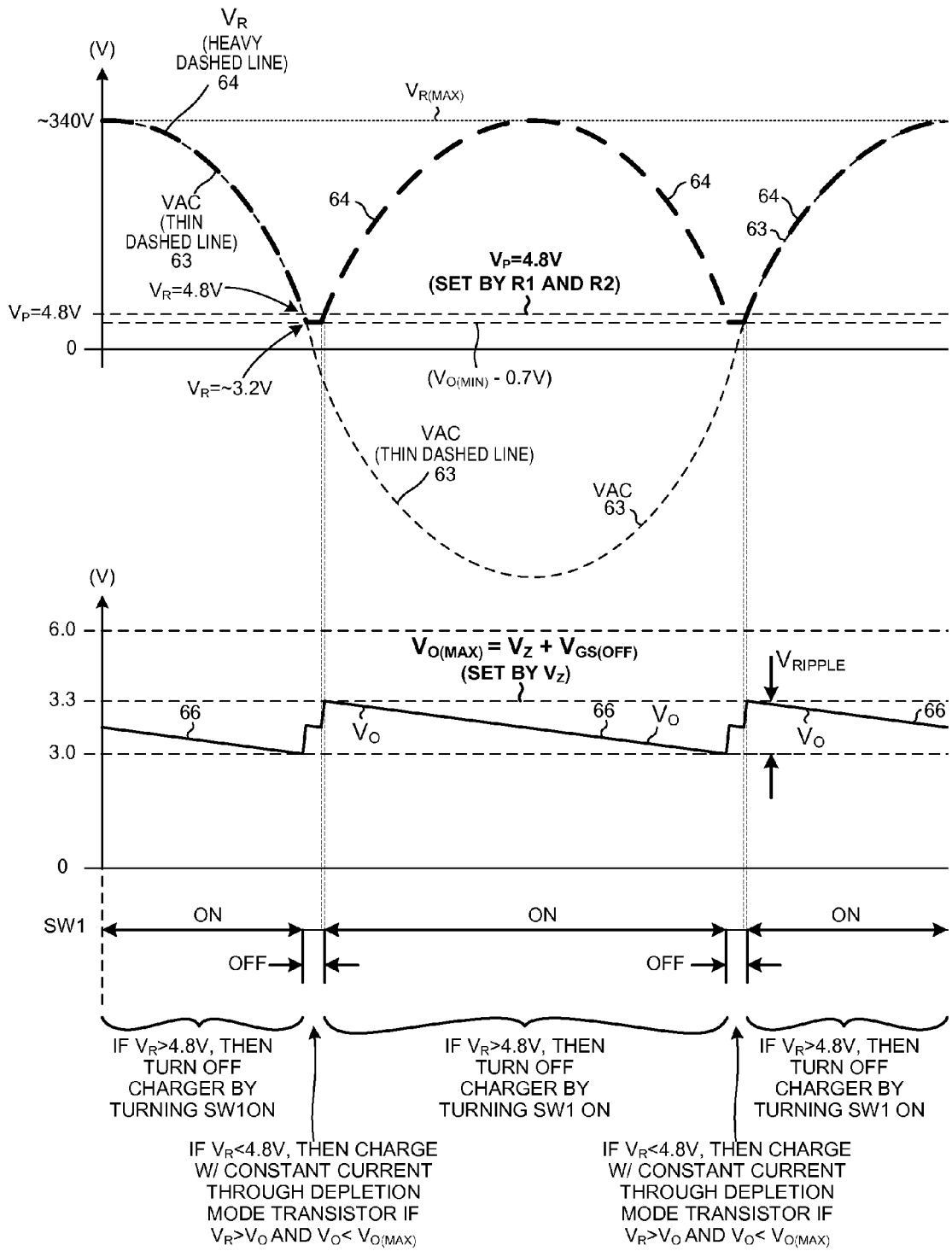
FIG. 3 is a simplified waveform diagram that shows how the output voltage $V_O$ changes in a steady state mode of operation, over about one period of the incoming AC supply voltage.

FIG. 3 is a simplified waveform diagram that illustrates operation of power supply circuit 10 of FIG. 1. In the upper part of the diagram, the thin dashed line 63 represents the incoming 240 VAC RMS sinusoidal 50 Hz supply voltage received from AC source 14. The heavy dashed line 64 represents the rectified periodic voltage signal $V_R$ on node 43. The maximum value $V_{R(MAX)}$ of the $V_R$ signal is about +340 volts. The signal $V_R$, at its lowest point, does not drop below 3.2 volts because there is no way for $V_R$ node 43 to discharge due to the blocking action of bridge rectifier 16. At most, $V_R$ is 0.7 volts lower than $V_O$ due to the body diode 65 of dep-FET 17. The anode of body diode 65 is coupled to $V_O$ node 47 and the cathode of body diode 65 is coupled to $V_R$ node 43.

Accordingly, in steady state operation of the AC-to-DC converter power supply circuit 10, signal $V_R$ is always of adequate magnitude to supply power to comparator 28 via supply lead 51. In other embodiments, the supply lead 51 of comparator 28 is connected to $V_O$ node 47 rather than to node 49. A signal diode is then provided between the non-inverting input lead 48 of comparator 28 and supply voltage lead 51 of comparator 28 to protect the comparator from overvoltage. The anode of this diode is coupled to the non-inverting input lead 48 and the cathode of this diode is coupled to the supply voltage lead 51.

As indicated in the bottom portion of FIG. 3, the first switch NFET 29 is turned on whenever $V_R$ is detected to be higher than the first predetermined voltage $V_P$ of 4.8 volts. Line 66 represents the output voltage $V_O$. During the times when the first switch NFET 29 is on, $V_O$ slowly decreases because the first capacitor 12 is being discharged due to its having to supply microcontroller 15 with supply current. The magnitude of the decrease in $V_O$ is determined by the frequency of the AC input voltage waveform, the amount of supply current $I_O$ to be supplied to the load, and by the capacitance of first capacitor 12. In the present example, $V_{O(MIN)}$ is 3.0 volts. During the times when the first switch SW1 NFET 29 is off, the charging circuit may supply the substantially constant charging current $I_{CHARGE}$ to first capacitor 12 so that the voltage $V_O$ on first capacitor 12 will increase up to its maximum value of $V_{O(MAX)}$. The substantially constant charging current $I_{CHARGE}$ in the present example is one ampere.

Figure 4:
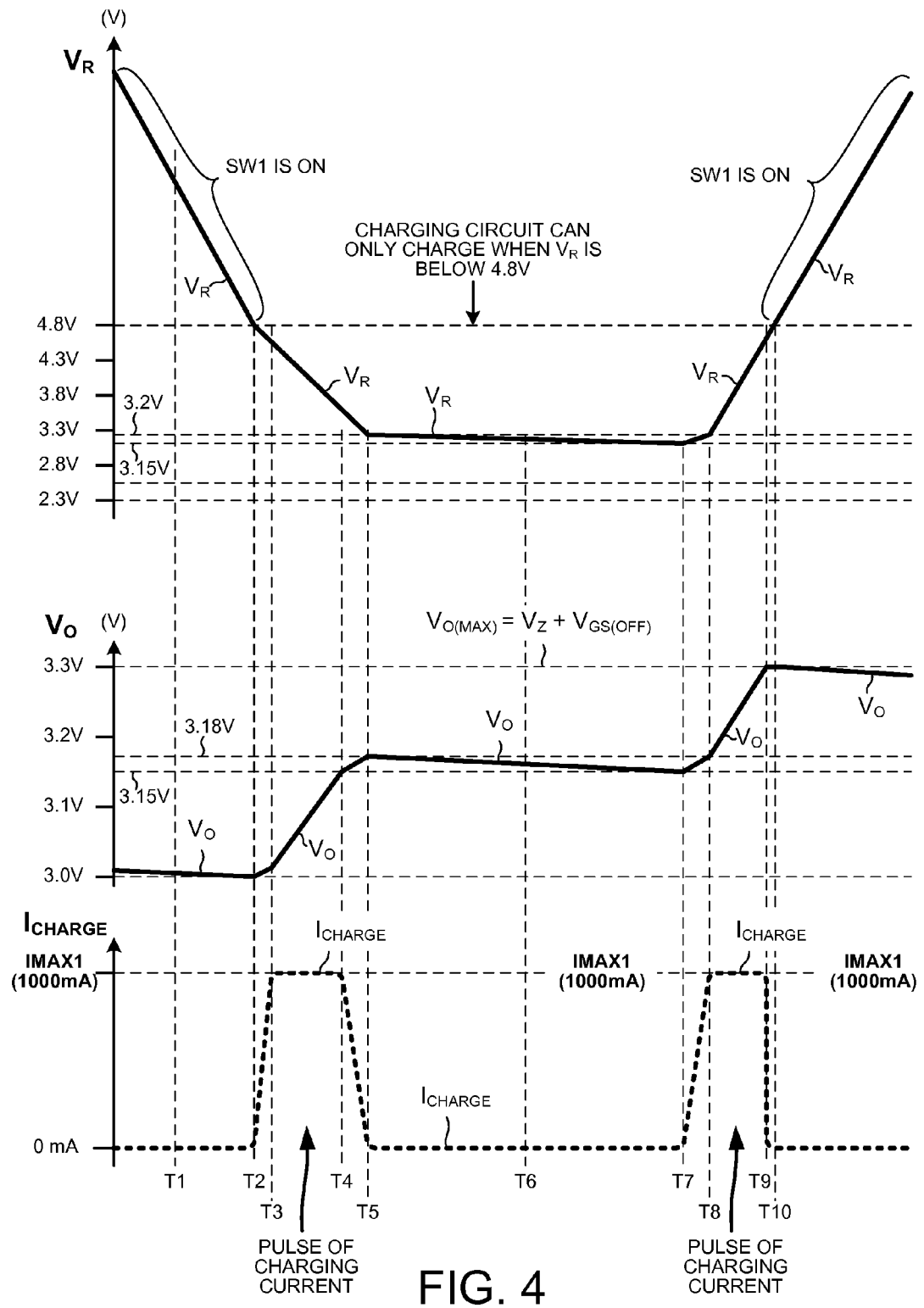
FIG. 4 is a simplified waveform diagram that shows two charging current ($I_{CHARGE}$) pulses and when they occur with respect to the rectified voltage signal $V_R$ and the output voltage $V_O$.

FIG. 4 is a waveform diagram that shows two times when the constant charging current $I_{CHARGE}$ flows. During each low point in $V_R$, there are two intervals of time when the substantially constant charging current $I_{CHARGE}$ flows. At time T1, $V_R$ is greater than $V_P$, so the first switch SW1 NFET 29 is turned on and dep-FET 17 is turned off and $V_O$ node 47 is decoupled from the $V_R$ node 43. No charging current flows. At time T2, when $V_R$ drops to be less than $V_P$, the first switch SW1 NFET 29 is turned off. Because $V_O$ is below the second predetermined voltage $V_{O(MAX)}$ and because $V_R$ is adequately higher than $V_O$, dep-FET 17 starts to turn on. By time T3, the charging current has reached its substantially constant value of one ampere. The charging current $I_{CHARGE}$ flows from $V_R$ node 43 to $V_O$ node 47 and to capacitor 12. As explained above, the magnitude of the charging current $I_{CHARGE}$ is substantially constant due to increased charging current flow serving to decrease the on resistance of dep-FET 17. All this time, $V_R$ is decreasing. At time T4, $V_R$ is so low with respect to $V_O$ that the charging circuit can no longer maintain constant current charging. For constant current charging at one ampere, $V_R$ must be approximately 1.5 volts higher than $V_O$. The 1.5 volts is the sum of the $R_{DS(ON)}$ of the dep-FET and the resistance of $R_S$, multiplied by one ampere. At time T5, $V_R$ is so low with respect to $V_O$ that the charging current flow stops entirely. From time T5, to T6, to T7, no charging current flows. The output voltage $V_O$ on first capacitor C1 12 decreases slightly due to capacitor 12 being discharged by the load. At time T7, when $V_R$ is again higher than $V_O$, charging resumes. When $V_R$ is adequately higher than $V_O$ at time T8 (adequately higher considering the specific $R_{DS(ON)}$ of dep-FET 17 at this time), charging continues with the substantially constant charging current $I_{CHARGE}$. The voltage $V_O$ on capacitor 12 increases back up to its $V_{O(MAX)}$ value of 3.3 volts. At time T9 the voltage $V_O$ on capacitor C1 12 reaches 3.3 volts. The source-to-gate voltage across the dep-FET 17 is therefore 2.5 volts due to the gate voltage of the dep-FET being fixed by the zener diode at 0.8 volts. Because $V_{GS(OFF)}$ of the dep-FET is 2.5 volts, the dep-FET is turned off at time T9 when $V_O$ reaches 3.3 volts. Regardless of whether the capacitor C1 12 is fully charged or not, when $V_R$ then increases further and exceeds the first predetermined voltage $V_P$, then the first switch SW1 NFET 29 is turned on again, and charging is disabled. This occurs at time T10 in the illustrative waveform diagram.

Because the first capacitor C1 12 is only charged when the magnitude of $V_R$ is close to $V_O$, there is not a large voltage drop across the charging circuit during the times when the charging current $I_{CHARGE}$ flows. As a result, power dissipation in power supply circuit 10 is reduced as compared to the power dissipation in a conventional linear regulator. In a conventional linear regulator in a situation such as this with a large AC supply voltage and a small DC output voltage, there are long stretches of time when there is a large voltage drop across a somewhat conductive transistor. In addition, in the novel AC-to-DC converter power supply circuit 10 there is no inductive component or opto-isolator as is common in conventional flyback converters. Such inductive components and opto-isolators are expensive. Moreover, there is no expensive and failure-prone large capacitor attached to the $V_R$ node of the bridge rectifier.

The components 32, 18 and 19 are optional. In one example, these components cause the charging current $I_{CHARGE}$ to have a second maximum value $I_{MAX2}$ during initial power up of the power supply circuit, whereas the charging current $I_{CHARGE}$ has a first maximum value $I_{MAX1}$ during subsequent steady state operation, where $I_{MAX2}$ is smaller than $I_{MAX1}$. Using reduced magnitude charging current pulses during initial power up of the power supply circuit 10 serves to reduce noise injected by the power supply back onto AC supply voltage conductors 67 when the first capacitor C1 12 of the power supply circuit 10 still has a low voltage. For additional details on the operation of optional components 32, 18 and 19, see: U.S. patent application Ser. No. 14/152,989, entitled "Non-Isolated AC-to-DC Converter Having A Low Charging Current Initial Power Up Mode", filed Jan. 10, 2014, by Leonid A. Neyman (the subject matter of which is incorporated herein by reference).

Figure 5:
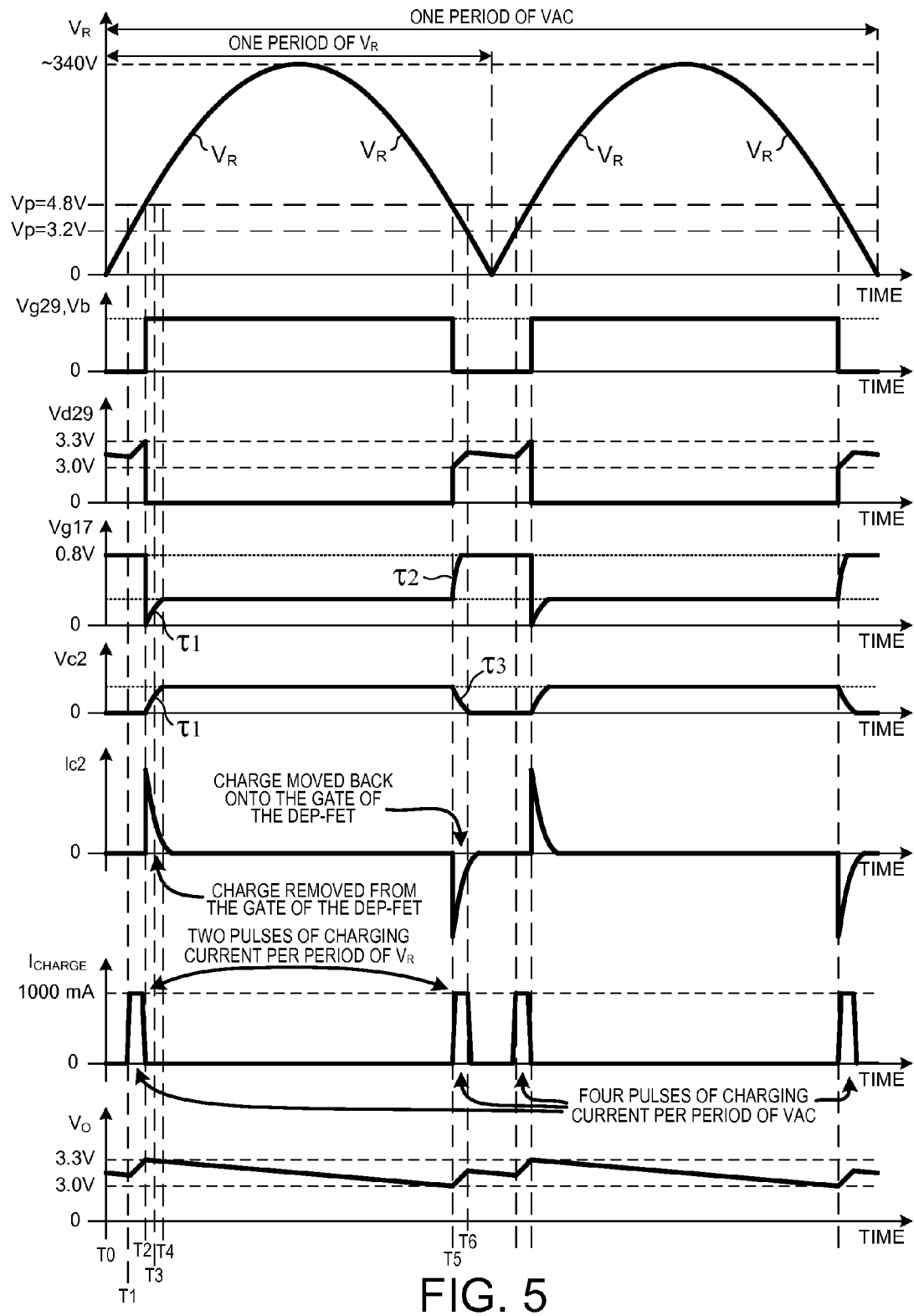

FIG. 5 is a waveform diagram that shows the transient operation of the second switch SW2 30 and the second capacitor C2 13 in further detail. The time period represented by the diagram of FIG. 5 is different than the time period represented by the diagram of FIG. 4, so the times T1, T2, T3 and so forth in FIG. 5 are not the same times as the times denoted in FIG. 4 by T1, T2, T3 and so forth. In the waveforms of FIG. 5, the notation "Vg29" indicates the voltage on the gate of the first switch NFET 29; the notation "Vb" indicates the voltage on the "b" control terminal 57 of the second switch SW2 30; the notation "Vg17" indicates the voltage on the gate of the dep-FET 17; the notation "Vc2" indicates the voltage across the second capacitor C2 13; and the notation "Ic2" indicates the current flowing through the second capacitor C2 13.

In the diagram of FIG. 5, starting at time T0 and proceeding until time T2, the voltage $V_R$ is less than $V_P$, so the charging circuit is enabled to charge and it does charge provided that $V_R$ is adequately higher than the output voltage $V_O$. In the example of FIG. 5, this charging starts at about time T1. A pulse of constant charging current $I_{CHARGE}$ then starts. During this time, the first switch SW1 is off (open) and the second switch SW2 is on (closed). As shown in the waveform Vc2, the second capacitor C2 is discharged. The second lead 53 of the second capacitor 13 is coupled to the $V_O$ node 47 through the second switch.

Next, at time T2, the comparator 28 detects that $V_R$ has risen above $V_P$. In response, the comparator 28 causes first switch SW1 to turn on, and causes second switch SW2 to turn off. This causes the second lead 53 of the discharged second capacitor C2 13 to be coupled to the ground node 44 through first switch NFET 29. This causes charge on the gate of dep-FET 17 and charge of the junction capacitance of the zener diode 31 to be removed and to be stored into the second capacitor C2 13. The resistance of resistor R3 is either zero or is very small. Assuming that the resistance of resistor R3 is zero as it is in this embodiment, then the cathode of the zener diode 31 as well as the first lead 54 of the second capacitor C2 13 are coupled to the $V_Z$ node, and the gate of dep-FET 17 is also coupled to the $V_Z$ node. Charge is therefore shared amongst these three capacitances (the junction capacitance of the zener diode, the capacitance of the second capacitor, and the gate capacitance of the dep-FET) in accordance with their respective capacitances. The voltage across the second capacitor C2 13 is $V_Z*(Cg+Cz)/C2$, where Cg is the gate capacitance of dep-FET 17, and where Cz is the junction capacitance of the zener diode 31. The capacitance of the second capacitor C2 13 is about ten times the sum of Cg and Cz, so the voltage across the second capacitor is about one tenth of $V_Z$. In the present example, about nine tenths of the original charge on the gate of dep-FET 17 and the junction capacitance of the zener diode is transferred into and is stored in the second capacitor C2 13, with roughly one tenth of the original charge remaining on the gate of the dep-FET 17 and zener junction capacitance. The resulting transient surge of current out of the gate of dep-FET 17 accelerates the turn off of dep-FET 17.

After the initial surge of transient current, the second capacitor C2 13 slow charges at a T1 time constant through resistor R1 47 until its voltage is equal to the voltage determined by the R1/R2 resistive voltage divider. Time T3 is a time during this slow charging period. The resistance of resistor R1 47 is 10 k ohms, and the resistance of resistor R2 22 is 100 ohms, so the voltage to which the second capacitor C2 13 is charged is given by $V_O*(R2/(R1+R2))$. This voltage is below the voltage required to turn the dep-FET 17 on, so dep-FET 17 remains off. The slow charging of the second capacitor ends at time T4 as indicated by the waveform labeled Vc2.

Between time T4 and time T5, the voltage $V_R$ is above $V_P$, so the comparator 28 keeps the first switch SW1 29 on (conducting) and keeps the second switch SW2 30 off (not conducting). Then, at time T5, the voltage $V_R$ drops below $V_P$, and the comparator 28 causes the first switch SW1 29 to turn off and causes the second switch SW2 30 to turn on. This causes the voltage $V_O$ on the first lead 41 of the first capacitor C1 12 to be coupled through terminal 33, and node 47, to the drain of the first switch SW1 NFET 29. As a result, the voltage $V_O+Vc1$ is applied onto the gate of dep-FET 17 (the resistance of R3 is zero in this case). If this voltage on the $V_Z$ node reaches the zener voltage $V_Z$, then further increase in the voltage is prevented by conduction through the zener diode 31 to ground. Consequently, the voltage on the gate of dep-FET 17 does not go above $V_Z$ (0.8 volts in this case). Charge that was previously stored in the charged second capacitor C2 13 is therefore moved back onto the gate of dep-FET 17, facilitating fast charging of the gate capacitance of dep-FET 17 as well as a junction capacitance of the zener diode 31, and facilitating fast turn on of dep-FET 17. The capacitance of the second capacitor C2 13 is 10,000 picofarads. Excessive charge from the second capacitor C2 13 (more than is required to charge the gate of the dep-FET and to bring the gate voltage on the $V_O$ node up to $V_Z$) is shunted through the zener diode 31 to ground. The charging time constant T2 of the gate of dep-FET 17 is roughly equal to $(Cg+Cz)*Rsw2$, where Rsw2 is the on resistance through second switch SW2 30. Rsw2 is in the one to ten ohm range. Assuming that (Cg+Cz) is less than 1000 picofarads, then $\tau 2$ is about one to ten nanoseconds. Once the gate of the dep-FET 17 is charged, the voltage on the gate is held at $V_Z$. Resistors R1 and R2 are connected in parallel in this case and provide current to zener diode 31.

With first switch SW1 29 being off, and with the second switch SW2 30 being on, the resistor R2 22 is coupled in parallel with the second capacitor C2. The second capacitor C2 therefore discharges through the parallel-connected resistor R2 22 down to zero volts. The discharging $\tau 3$ time constant through the resistance of resistor R2 22 is the capacitance of the second capacitor C2 13 times the resistance of resistor R2 22.

Starting at time T5, the dep-FET 17 is on, and a pulse of the constant charging current $I_{CHARGE}$ begins flowing, thereby putting charge into first capacitor C1 12. The voltage $V_O$ on the first capacitor C1 12 therefore increases starting at time T5 as illustrated in the $V_O$ waveform.

At time T6, the voltage $V_R$ has decreased to the point that there is no longer an adequate voltage drop across the dep-FET 17, so the dep-FET 17 stops conducting the charging current. This ends the second pulse of charging current (the second pulse of charging current in the period of the signal $V_R$). This operation of the power supply circuit during on period of the signal $V_R$ is repeated, from period to period of $V_R$.

Accordingly, it is seen that there are four different pulses of the charging current $I_{CHARGE}$ that flow into the first capacitor C1 12 during each sinusoidal period of the 240 volt RMS AC supply voltage. Moreover, charge is removed from the gate of the dep-FET and is stored in the second capacitor, and then charge from the second capacitor is moved from the second capacitor back onto the gate of the dep-FET, and then charge is again removed from the gate of the dep-FET and is stored in the second capacitor, and then charge from the second capacitor is again moved from the second capacitor back onto the gate of the dep-FET, all within the same one period of the 240 VAC RMS 50 Hz supply voltage. The removing of charge from the gate of the dep-FET 17 speeds turn off of the dep-FET, and the moving of charge from the second capacitor back onto the gate of the dep-FET speeds turn on of the dep-FET.

In the case of the AC supply voltage being a 120 VAC RMS 60 Hz signal, without the second switch SW2 and the second capacitor C2, there may be enough time for the dep-FET to turn on at T5 so that there is a pulse of charging current between time T5 and T6, but in the case of the AC supply voltage being a 240 VAC RMS 50 Hz signal it has been found that the steepness of decline of the voltage $V_R$ results in some cases in there being no pulse of charging current between times T5 and T6. The dep-FET takes so long to turn on that by the time it is ready to conduct the magnitude of $V_R$ has decreased to where there is not enough forward $V_{DS}$ voltage drop across the dep-FET for the dep-FET to conduct charging current. The novel second switch SW2 30 and the novel second capacitor C2 13 serve to speed up the turn on of the dep-FET 17 so that in the case of a 240 VAC RMS 50 Hz supply voltage there is a pulse of charging current between times T5 and T6.

Figure 6:
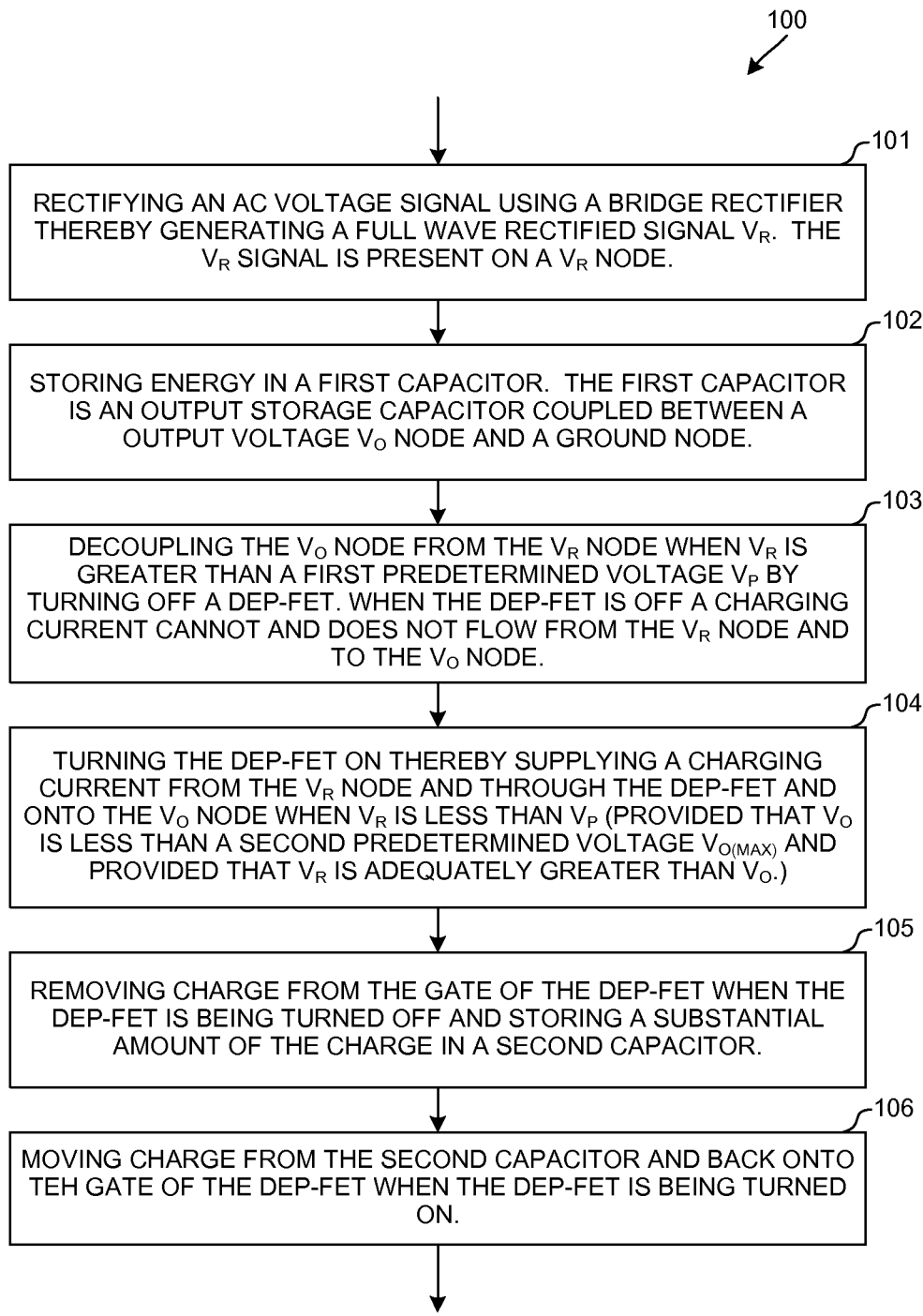
FIG. 6 is a flowchart of a method 100 in accordance with one novel aspect.

FIG. 6 is a flowchart of a method 100 of operation of a power supply circuit in accordance with one novel aspect. An AC voltage supply signal is rectified (step 101) using a bridge rectifier and the resulting rectified signal $V_R$ is supplied onto a $V_R$ node. Energy is stored (step 102) in a first capacitor. The first capacitor is an output storage capacitor coupled between an output voltage $V_O$ node and a ground node. When $V_R$ is greater that a first predetermined voltage $V_P$ then a dep-FET is turned off. A charging current cannot and does not flow from the $V_R$ node and through the dep-FET and to the $V_O$ node. If, however, $V_R$ is less than the first predetermined voltage $V_P$, then the dep-FET is turned on so that a charging current from the $V_R$ node passes through the dep-FET and onto the $V_O$ node (provided that $V_O$ is less than a second predetermined voltage $V_{O(MAX)}$ and provided that $V_R$ is adequately greater than $V_O$). During this operation, when the dep-FET is being turned off, then charge is removed from the gate of the dep-FET and a substantial amount of the removed charge is stored in a second capacitor, whereas during this operation when the dep-FET is being turn on, then charge from the second capacitor is moved back onto the gate of the dep-FET. The steps 101-106 of FIG. 6 do not occur in sequence one after another, but rather all occur simultaneously or at appropriate times over and over as the power supply circuit operates in a steady state (not power up) mode. In one example, steady state mode operation is operation after initial startup conditions have passed, when the power supply circuit is under some load, and when the output voltage $V_O$ on the first capacitor goes up and down and ranges somewhere between a predetermined $V_{O(MIN)}$ voltage and a predetermined $V_{O(MAX)}$ voltage, for period after period after period of the input AC supply voltage.

For additional description, examples, and embodiments of a non-isolated AC-to-DC converter power supply circuit whose dep-FET is controlled so that pulses of charging current flow through the dep-FET into a storage capacitor as set forth in simplistic fashion in FIG. 4 so that the output voltage $V_O$ on the storage capacitor ripples roughly as shown in FIG. 3 and so that there is not a large voltage drop across the dep-FET when the dep-FET is conducting, see: 1) U.S. patent application Ser. No. 13/569,458, entitled "High-Efficiency, Low-Power Supply Circuit", filed Aug. 8, 2012, by Leonid A. Neyman, now published as US2014/0043878, and 2) U.S. patent application Ser. No. 14/152,989, entitled "Non-Isolated AC-to-DC Converter Having A Low Charging Current Initial Power Up Mode", filed Jan. 10, 2014, by Leonid A. Neyman, now published as US2014/0126258. The entire content of each of these two patent applications is incorporated herein by reference in its entirety.

In one example, the components of the power supply circuit 10 of FIG. 1 are, except for the first capacitor, assembled together in a module package, with the rectifier, NFETs, PFETs, dep-FET, zener diode, comparator, voltage reference, second capacitor, and resistors being discrete surface mount components that are surface mounted onto an etched metal layer of a DBC (Direct-Bonded Copper) alumina substrate. The assembly is then overmolded with plastic encapsulant to make the module package. The first capacitor is realized outside the module package as three parallel-coupled ceramic capacitors.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
    (a) receiving an alternating current (AC) supply voltage onto a rectifier and outputting a rectified voltage signal $V_R$ onto a $V_R$ node;
    (b) storing energy in a first capacitor so that the first capacitor is charged to a direct current (DC) voltage, wherein the first capacitor is coupled between an output voltage node $V_O$ and a ground node GND;
    (c) in a steady state operation mode of a non-isolated AC-to-DC power supply circuit: 1) decoupling the $V_O$ node from the $V_R$ node when $V_R$ is greater than a first predetermined voltage $V_P$ by turning off a depletion-mode field effect transistor (dep-FET) and, 2) turning on the dep-FET and thereby supplying a substantially constant charging current ($I_{CHARGE}$) from the $V_R$ node and through the dep-FET and onto the $V_O$ node when $V_R$ is less than $V_P$ provided that $V_O$ is less than a second predetermined voltage $V_{O(MAX)}$ and provided that $V_R$ is greater than $V_O$;
    (d) removing charge from a gate of the dep-FET when the dep-FET is being turned off in the steady state operation mode such that a substantial amount of the charge from the gate is transferred into and is stored in a second capacitor; and
    (e) moving charge from the second capacitor and back onto the gate of the dep-FET when the dep-FET is being turned on in the steady state operation mode.

2. The method of claim 1, wherein the second capacitor is a discrete capacitor component.

3. The method of claim 1, wherein charge is removed from the gate in (d) by coupling a second lead of the second capacitor to the ground node GND, and wherein the charge is moved in (e) from the second capacitor and onto the gate of the dep-FET by coupling the second lead of the second capacitor to the output voltage $V_O$ node.

4. The method of claim 3, wherein a first lead of the second capacitor is coupled to the gate of the dep-FET.

5. The method of claim 3, wherein a first lead of the second capacitor is coupled to the gate of the dep-FET via a resistor.

6. The method of claim 1, wherein charge is removed from the gate in (d) by coupling a second lead of the second capacitor to the ground node GND through an N-channel field effect transistor, and wherein the charge is moved in (e) onto the gate of the dep-FET by coupling the second lead of the second capacitor to the output voltage $V_O$ node through a P-channel field effect transistor.

7. The method of claim 1, wherein the substantially constant charging current flows in a charging current path from the $V_R$ node, through the dep-FET, and then through a resistor, to the output voltage node $V_O$, and to the first capacitor.

8. The method of claim 1, further comprising:
(f) using a zener diode to clamp the voltage on the gate of the dep-FET.

9. The method of claim 8, wherein in (e) more charge is moved out of the second capacitor than is required to charge the gate of the dep-FET such that at least some of this excessive charge from the second capacitor flows through the zener diode and to the ground node GND.

10. The method of claim 1, wherein the AC-to-DC power supply circuit comprises the rectifier, the first capacitor, the dep-FET, and the second capacitor, wherein the AC-to-DC power supply circuit comprises no inductive component that has a winding wrapped around any magnetic core.

11. The method of claim 1, wherein the AC supply voltage is a sinusoidal voltage that has a peak amplitude greater than 200 volts, and wherein there are four pulses of charging current that flow through the dep-FET and into the first capacitor during one period of the AC supply voltage.

12. A circuit for charging a first capacitor to a direct current (DC) voltage, wherein the first capacitor has a first lead coupled to an output voltage $V_O$ node, and wherein the first capacitor has a second lead coupled to a GND node, the circuit comprising:
a rectifier that supplies a rectified voltage signal $V_R$ onto a $V_R$ node;
a depletion mode field effect transistor (dep-FET) through which a charging current can flow from the $V_R$ node to the $V_O$ node;
a resistor voltage divider coupled between the $V_R$ node and the GND node, wherein the resistor voltage divider has a tap node;
a reference voltage node;
a comparator having a first input lead coupled to the tap node of the resistor divider and having a second input lead coupled to receive a reference voltage from the reference voltage node;
a first switch having a control terminal that is coupled to an output lead of the comparator, wherein the first switch has a second terminal coupled to the GND node, and wherein the first switch has a third terminal;
a zener diode having an anode and a cathode, wherein an anode of the zener diode is coupled to the GND node;
a first resistor having a first lead coupled to the output voltage $V_O$ node and having a second lead coupled to the cathode of the zener diode;
a second resistor having a first lead coupled to a gate of the dep-FET and having a second lead coupled to the third terminal of the first switch;
a second capacitor having a first lead coupled to the cathode of the zener diode and having a second lead coupled to the third terminal of the first switch; and
a second switch having a control terminal, and having a second terminal coupled to the third terminal of the first switch, and having a third terminal coupled to the output voltage $V_O$ node.

13. The circuit of claim 12, wherein the second switch is closed if the first switch is open, and wherein the second switch is open if the first switch is closed.

14. The circuit of claim 12, wherein the second lead of the first resistor is coupled to the first lead of the second resistor via a third resistor.

15. The circuit of claim 12, wherein the second lead of the first resistor is directly shorted to the first lead of the second resistor.

16. The circuit of claim 12, further comprising:
a fourth resistor, wherein a first lead of the fourth resistor is coupled to a source of the dep-FET, and wherein a second lead of the fourth resistor is coupled to the output voltage $V_O$ node.

17. The circuit of claim 12, further comprising:
a reference voltage generator that outputs the reference voltage onto the reference voltage node.

18. The circuit of claim 12, wherein the first switch is an N-channel field effect transistor, and wherein the second switch comprises a P-channel field effect transistor.

19. The circuit of claim 18, wherein the second switch further comprises means for receiving a signal from the comparator and for generating a drive signal for the P-channel field effect transistor.

20. The circuit of claim 12, wherein the rectifier receives a periodic sinusoidal alternating current (AC) supply voltage that has a peak amplitude greater than 200 volts, and wherein there are four pulses of charging current that flow through the dep-FET and into the first capacitor during at least some periods of the AC supply voltage.

21. The circuit of claim 12, wherein charge is removed from the gate of the dep-FET by coupling the second lead of the second capacitor to the ground node GND through the first switch, and wherein at least some of the charge is moved from the second capacitor and onto the gate of the dep-FET by coupling the second lead of the second capacitor to the output voltage $V_O$ node through the second switch.

22. A circuit for charging a first capacitor to a direct current (DC) voltage, wherein the first capacitor has a first lead coupled to an output voltage $V_O$ node, and wherein the first capacitor has a second lead coupled to a ground node GND, the circuit comprising:
a depletion mode field effect transistor (dep-FET), wherein if the dep-FET is turned on then a substantially constant charging current can flow from a rectified voltage $V_R$ node to the $V_O$ node provided that the voltage on the rectified voltage $V_R$ node is adequately greater than the voltage on the output voltage $V_O$ node;
a voltage detector circuit that turns the dep-FET off if the voltage on the rectified voltage $V_R$ node is above a fixed predetermined voltage $V_P$;

a zener diode having an anode and a cathode, wherein the anode of the zener diode is coupled to the GND node, and wherein the cathode is coupled to a gate of the dep-FET;

a first resistor coupled between the output voltage $V_O$ node and the cathode of the zener diode;

a second resistor coupled between a source of the dep-FET and the output voltage $V_O$ node; and means for removing charge from the gate of the dep-FET when the dep-FET is being turned off and for storing a substantial amount of that removed charge in a capacitance, and for moving at least some of the stored charge from the capacitance and back onto the gate of the dep-FET when the dep-FET is being turned on.

23. The circuit of claim 22, wherein the cathode of the zener diode is coupled to the gate of the dep-FET through a small resistance.

24. The circuit of claim 22, wherein the cathode of the zener diode is directly shorted to the gate of the dep-FET.

25. The circuit of claim 22, wherein the means for removing charge from the gate of the dep-FET when the dep-FET is being turned off stores at least a majority of the removed charge in the capacitance.

26. The circuit of claim 22, further comprising:

a rectifier that receives a periodic sinusoidal alternating current (AC) supply voltage and that supplies the rectified voltage $V_R$ onto the rectified voltage $V_R$ node.

27. The circuit of claim 26, wherein the periodic sinusoidal AC supply voltage has a peak amplitude greater than 200 volts, wherein the means is for removing charge from the gate of the dep-FET in two different pulses of current each period of the periodic sinusoidal AC supply voltage, and wherein the means is also for moving charge from the capacitance back onto the gate of the dep-FET in two different pulses of current each period of the periodic sinusoidal AC supply voltage.

* * * * *